March 1, 1949.   E. S. MacPHERSON   2,463,040
TRACK DRIVE
Filed Aug. 22, 1945   3 Sheets-Sheet 1
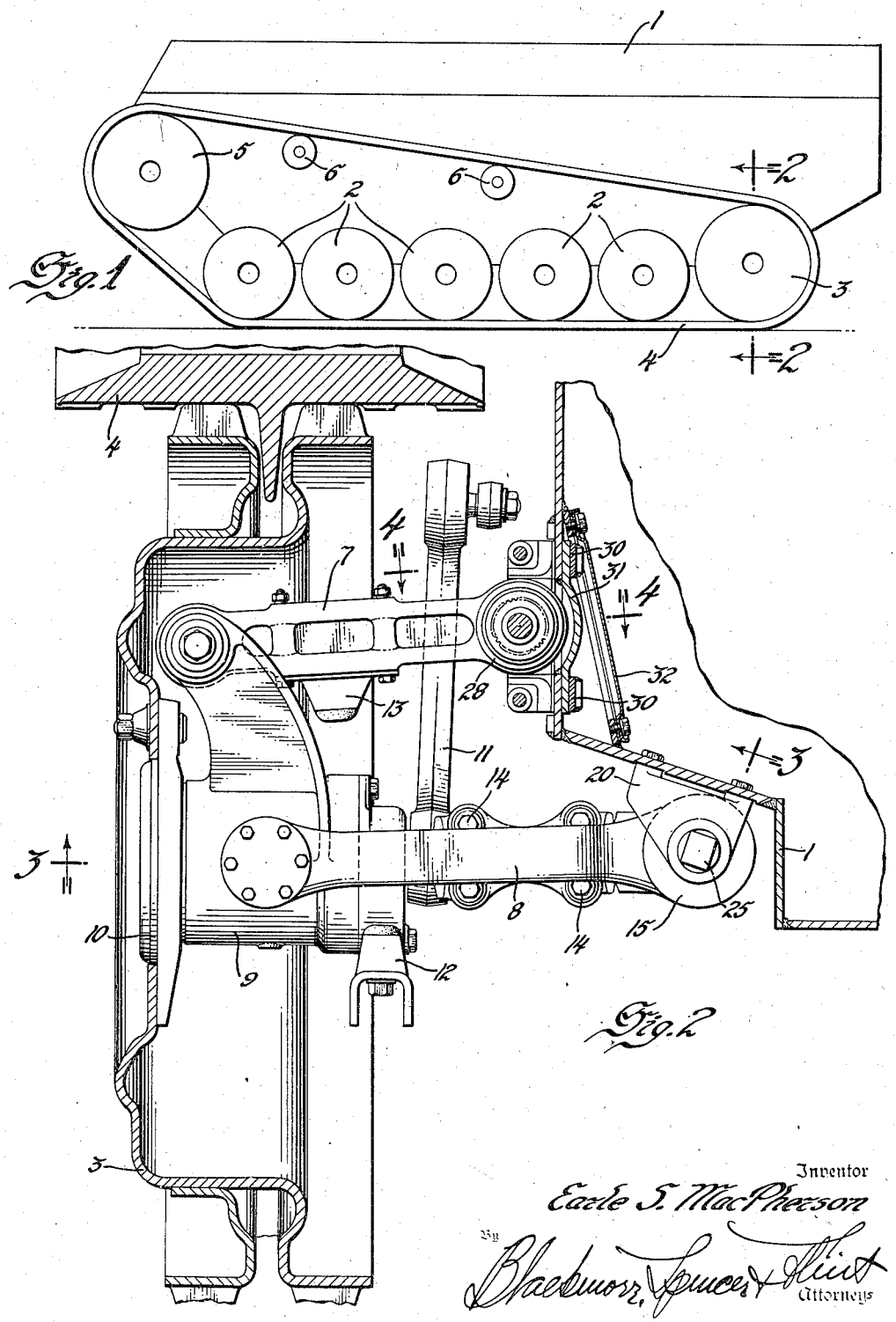
Inventor
Earle S. MacPherson
By Blackmore, Spencer & Flint
Attorneys March 1, 1949.     E. S. MacPHERSON     2,463,040
TRACK DRIVE Filed Aug. 22, 1945     3 Sheets-Sheet 2

Inventor
Earle S. MacPherson
By
Blackmore, Smeas & Flint
Attorneys

March 1, 1949.  E. S. MacPHERSON  2,463,040
TRACK DRIVE
Filed Aug. 22, 1945  3 Sheets-Sheet 3

Inventor
Earle S. MacPherson
By Blackmor, Spencer & Flint
Attorneys

Patented Mar. 1, 1949

2,463,040

UNITED STATES PATENT OFFICE 2,463,040

TRACK DRIVE

Earle S. MacPherson, Detroit, Mich., assignor to General Motors Corporation, Detroit, Mich., a corporation of Delaware Application August 22, 1945, Serial No. 612,084

10 Claims. (Cl. 305—9)

This invention relates to an improved vehicle wheel suspension system for use especially with endless track installations. Track slack take-up devices usually are essential to insure proper fit necessary to keep the track entrained on the wheels against accidental throwoff, especially at high speeds. High speed requirements dictate reduction in weight and an object of the present invention is to provide a lightweight sturdy and reliable rocker arm suspension assembly utilizing a load supporting torsion bar spring to accommodate vertical wheel deflection.

A further object is to provide an improved lever arm and spring bar mounting having adjustable settings suitable for effecting quick and sure longitudinal shifting of the wheel position and in particular the end wheel about which the self-laying track has a return loop.

Figure 3:
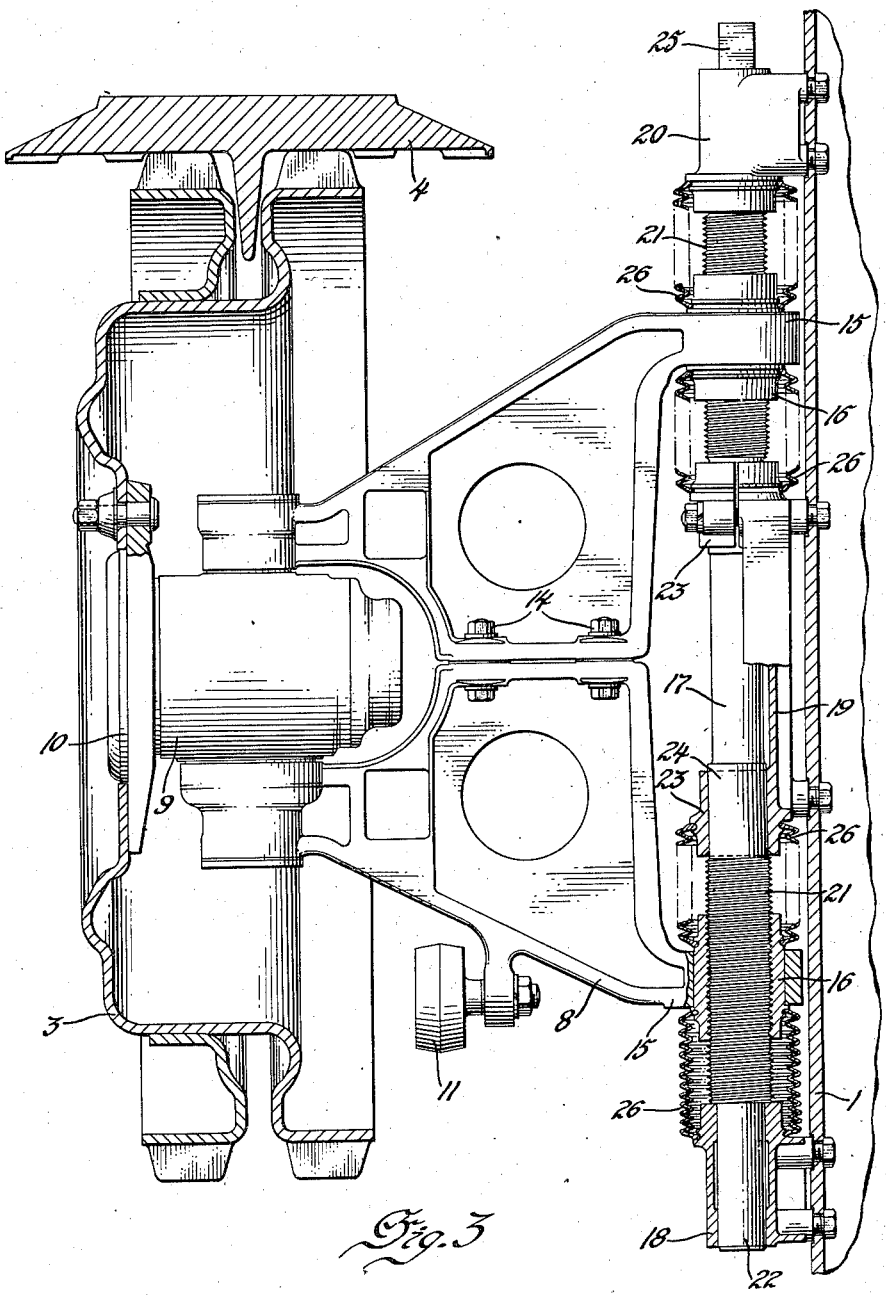
Figure 5:
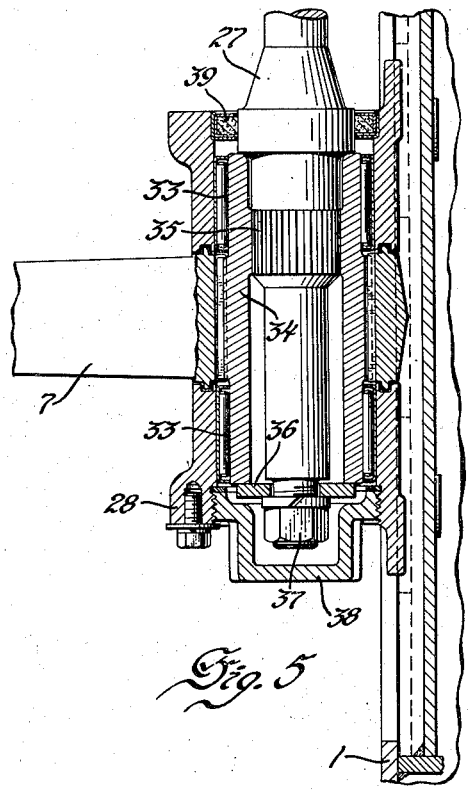
Figure 4:
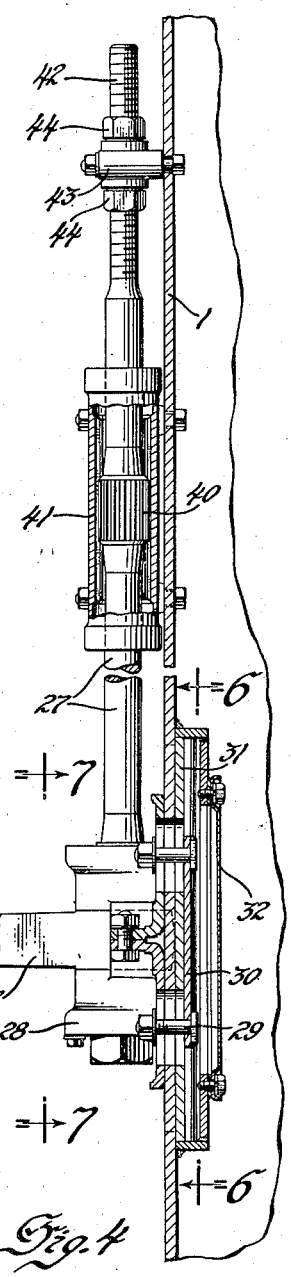
Figure 6:
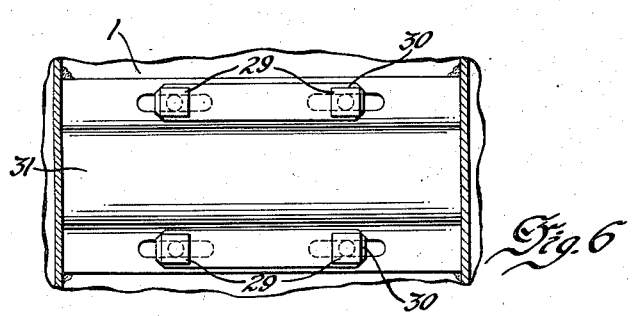
Figure 7:
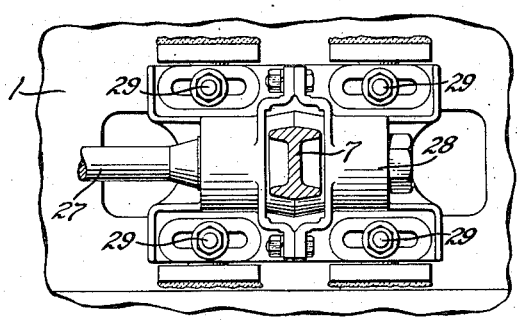

Additional objects and advantages will appear in the course of the following specification having reference to the accompanying drawing wherein Figure 1 is a side elevation of an endless track vehicle; Figure 2 is a transverse vertical sectional view of the endmost road wheel, as on line 2—2 of Figure 1; Figure 3 is a longitudinal section looking up on line 3—3 of Figure 2 and illustrating the adjustable mounting of the lower rocker arm; Figure 4 shows the adjustable mounting of the upper arm and torsional spring bar, as on line 4—4 of Figure 2; Figure 5 is an enlarged detail section of the journal mounting and spring connection of the upper rocker arm and Figures 6 and 7 are detail views looking in the direction of the arrows on lines 6—6 and 7—7, respectively, of Figure 4.

In the drawing the reference character 1 indicates the body or hull of the vehicle to be flexibly suspended at either side by a longitudinal succession of road wheels 2—2 and 3, the latter being an end wheel of larger diameter than the remaining wheels 2—2. Between the wheels and the ground is the usual endless self-laying track or band 4 which may be the conventional articulated shoe type with one end loop entrained about the end wheel 3. In a self-propelled vehicle the other end loop of the track is to be engaged with a driving sprocket wheel 5. Idler rollers 6—6 support the upper reach of the track. Variable settings of the distance between end wheel centers enables proper fitting of the track for original installation and for subsequent maintenance and compensation for dimensional changes such as occur due to wear, stretch and service replacements.

As shown in the detail views the end wheel 3 is connected to the hull 1 by a pair of vertically spaced transverse rocker arms or levers 7 and 8 each pivotally joined on longitudinal axes at opposite ends to the hull 1 and a forged journal box 9 for the stub shaft and hub 10 of the wheel 3. A strut or link 11 for a shock absorber, not shown, is connected with the lower arm 8 and a bumper 12 carried by the journal box 9 is arranged to engage the arm 8 as an abutment stop to limit wheel deflection and a similar bumper 13 is carried by the upper arm 7 to engage the journal box. For convenience the lower arm 8 is forged in two complementary halves joined by bolts 14 and each terminates at its inner end in an eye 15 in which is press fitted a bearing sleeve 16 oscillatably mounted on a longitudinally extending shaft 17 having supporting brackets 18, 19 and 20 fixedly bolted or otherwise secured to the hull 1. The oscillatory bearing surfaces in both of the longitudinally spaced apart joints are in the nature of helical screw threads and the externally threaded portions 21—21 on the shaft are considerably longer than the internally threaded sleeves 16 to enable a wide range of adjustment of the interengaging threads. Thus rotation of the shaft, and by reason of the screw thread bearings, will enable the rocker arm 8 to be shifted longitudinally either backward or forward as required in adjusting the position of the road wheel.

Longitudinal displacement of the shaft 17 is precluded by the opposing thrust abutment faces at the endmost bearing brackets 18 and 20 engaging shoulders afforded between the threaded shaft portions 21—21 and the reduced diameter bearing portions 22 rotatably mounted in the respective brackets 18 and 20. The shaft 17 is releasably locked about rotation by split clamp formations 23 at opposite ends of the center bracket 19 engaging with reduced shaft portions 24. When the clamping bolts and nuts are drawn tight the shaft is held rigid but release of the clamps will permit shaft rotation by application of a suitable wrench to the squared or flattened shaft terminal 25 projecting beyond the wheel suspension assembly for easy access. To encase the otherwise exposed shaft threads flexible bellows-like boots 26—26 surround both ends of the shaft portions 21—21 and are formed with terminal beads to snap into annular grooves in the adjoining bearing sleeves and bearing brackets. The boots preferably are of an oil resistant synthetic rubber and keep dirt from reaching the lubricating bearing surfaces.

With the lower arm 8 adjustably mounted on the hull provision is also made for change in position of the upper arm 7 with which is associated the torsion bar spring 27. A simple arrangement is a clamp bolt and longitudinal slot connection between the hull and the mounting bracket 28 in which the arm 7 is hinged. Four of such bolts 29 are shown in Figures 4, 6 and 7 having their heads welded to upper and lower straps 30 inside the hull and with the bolts projecting outwardly through aligned longitudinally elongated slots in the internal stiffener plate 31, the hull body and the mounting flanges of the bracket 28 and receiving external nuts for removably clamping the parts. A removable inspection plate or door 32 is desirably used to seal the bolt receiving openings through the hull.

The hinged mounting of the upper arm 7 is by means of two sets of roller bearings 33—33, spaced on opposite sides of the arm and interposed between cylindrical portions of the bracket 28 and a tubular part 34 keyed to the arm 7 and sleeved on the adjacent end of the spring bar 27. Serrations or splines 35 key the sleeve to the spring bar or torsional rod 27 and the sleeve is secured by its abutment at one end with an enlarged shoulder on the bar end by a clamping washer 36 held against the opposite sleeve end by a fastening nut 37. One end of the hollow bracket is closed by a threaded plug 38 and the other end is closed by a sealing ring or gasket 39 engaging the relatively rotatable torsion bar at the rocker arm end thereof.

The opposite end of the torsion bar 27 needs to be fixed so that its intermediate portion can be twisted incident to its elastic suspension of the load, the length of the bar between the oscillatory arm and the nonrotative anchorage being determined by the characteristics of the bar in relation to the load to be supported. For a nonrotational anchorage of the fixed end it is proposed to provide the bar with an externally splined portion 40 having a slip fit with an internally splined bracket 41 bolted to the hull. Beyond the splined portion 40 the bar terminates in a reduced diameter threaded tip 42 extending through an eye or apertured bracket 43 bolted to the hull and having jam nuts 44—44 threaded thereon to be drawn tightly against the opposite faces of the eye 43 for locking the spring bar against longitudinal displacement except when the nuts 44 are turned back to allow slippage of the splined portions 40 and 41 in accommodating relocation of the rocker arm supporting bracket 28 as wheel setting is varied.

I claim:

1. In an endless track assembly, an endless drive track, a track take-up wheel about which said track is looped, a suspension arm for the wheel, a mounting shaft having threaded bearing engagement with the arm and extending longitudinally of said track and means to impart relative rotation to the shaft and arm to cause by reason of said threaded bearing engagement a longitudinal shifting of the wheel in accordance with track length.

2. In combination, an endless drive loop, a wheel over which the loop is entrained, a wheel supporting a rockable arm journaled on an axis extending substantially longitudinally of the loop for enabling wheel deflection in a plane transverse to the loop length, and a rotatably adjustable mounting shaft having threaded bearing engagement with the arm to accommodate rocking movement of the arm and the longitudinal positioning of the wheel upon rotatable adjustment of the mounting shaft.

3. In an endless track vehicle, a track loop, a suspension wheel having a loop end entrained thereon, a wheel supporting rocker arm accommodating wheel deflection, a rotatably adjustable shaft mounting said arm on an axis extending longitudinally of the vehicle, and interengaging screw threaded bearings on the shaft and arm for causing longitudinal travel of the arm upon shaft rotation.

4. In an endless track vehicle having a supporting wheel over which a track end loop runs, a wheel suspension rocker arm, a rotatably adjustable shaft for mounting the arm on a longitudinal axis and having screw threaded bearing engagement with the arm, means to support the shaft for rotation and against longitudinal travel and means to releasably clamp the shaft against rotation.

5. In an endless track vehicle having a supporting wheel over which a track end loop runs, a wheel suspension rocker arm, a rotatably adjustable shaft for mounting the arm on a longitudinal axis and having screw threaded bearing engagement with the arm, means to support the shaft for rotation and against longitudinal travel and means to releasably clamp the shaft against rotation, a second wheel suspension rocker arm in spaced parallelism to the first and a torsion spring bar operatively connected with said second wheel suspension rocker arm.

6. In an endless track vehicle having a supporting wheel over which a track end loop runs, a pair of substantially parallel wheel suspension rocker arms, each pivotally joined at its opposite ends to the vehicle and to the wheel, respectively, a torsion bar load supporting spring operatively connected to one end of one of the rocker arms, adjustable means associated with an end of the other rocker arm to enable the wheel to be positioned longitudinally of the track to compensate for track slack and a fixed anchorage bracket slidably and nonrotatively engaged with the spring torsion bar to take the reaction thereof and accommodate wheel position change upon adjustment of said means.

7. A wheel suspension for vehicles, including a pair of spaced rocker arms, adjustable means mounting both arms for selective longitudinal positioning in various relative settings, a torsion bar spring operatively connected at one end to one of said arms and a fixed anchorage support for the other end of the torsion bar spring and engaging the same with a nonrotative slip fit to accommodate the adjustment settings of said arms.

8. In a vehicle wheel suspension system, a transverse rocker arm, a longitudinally adjustable bracket pivotally mounting said arm on a longitudinal axis, a longitudinally extending load supporting torsion spring bar secured at one end to said arm, and supporting means slidably and nonrotatably engaging the torsion bar near its opposite end.

9. In a vehicle wheel suspension system, a rocker arm, a supporting bracket in which said arm is journaled, a pin and slot mounting for said bracket to enable the same to be shifted axially of the journal to selected settings, a torsion spring bar having one end joined to said arm, an axially adjustable support for the opposite end of the torsion spring bar for cooperation with said pin and slot mounting and spring reaction anchorage device engaging the torsion spring bar near said last-mentioned end with a nonrotative slip fit.

10. Suspension means between a vehicle and a road wheel, including a rocker arm having pivotal connection at one end with the road wheel and having at its opposite end a pair of axially spaced bearing eyes, each formed with internal helical bearing threads, a supporting journal shaft projecting through both eyes and having external helical bearing threads in engagement with said internal bearing threads of both eyes, vehicle carried means journaling said shaft for rotation, interengaging shoulders on the shaft and said journal means to prevent axial travel of the shaft upon its rotation and to compel axial travel of the eyes through their threaded engagement with the shaft, and means to releasably lock the shaft against rotation.

EARLE S. MacPHERSON.

REFERENCES CITED

The following references are of record in the file of this patent:

UNITED STATES PATENTS

| Number | Name | Date |
|---|---|---|
| 1,947,475 | Knox et al. | Feb. 20, 1934 |
| 2,255,088 | Shroeter | Sept. 9, 1941 |